(12) United States Patent
Sharp

(10) Patent No.: US 7,600,327 B2
(45) Date of Patent: Oct. 13, 2009

(54) TAPE MEASURE WITH MANUAL AND POWER TOOL ASSISTED REWIND HANDLE

(76) Inventor: Glenn M. Sharp, 10424 Shawnee Rd., Harrington, DE (US) 19952

( * ) Notice: Subject to any disclaimer, the term of this patent is extended or adjusted under 35 U.S.C. 154(b) by 129 days.

(21) Appl. No.: 11/760,891

(22) Filed: Jun. 11, 2007

(65) Prior Publication Data

US 2008/0301967 A1 Dec. 11, 2008

(51) Int. Cl.
*G01B 3/10* (2006.01)
(52) U.S. Cl. .................... 33/769; 33/761; 242/390; 242/395.1
(58) Field of Classification Search ............ 33/755, 33/756, 761, 762, 763, 768, 769; 242/389, 242/390, 390.8, 394, 395, 395.1; D10/72
See application file for complete search history.

(56) References Cited

U.S. PATENT DOCUMENTS

| 1,058,311 | A | * | 4/1913 | Lewis et al. | ............... | 242/396.5 |
| 1,502,340 | A | * | 7/1924 | Keuffel | .................... | 242/396.5 |
| 3,313,498 | A | * | 4/1967 | Wasson | ................... | 242/395.1 |
| 3,979,833 | A | * | 9/1976 | Grundman | ................. | 33/701 |
| 4,228,589 | A | * | 10/1980 | Chemay | .................... | 33/759 |
| 4,962,901 | A | | 10/1990 | Shirley et al. | | |
| 5,044,089 | A | | 9/1991 | Petkovic et al. | | |
| 5,190,237 | A | * | 3/1993 | Fagan | ....................... | 242/390.8 |
| 5,277,350 | A | * | 1/1994 | Thornbury, Jr. | ......... | 244/155 A |
| 6,398,147 | B1 | | 6/2002 | Fredrickson | | |
| 6,513,791 | B1 | * | 2/2003 | Yates | ................. | 254/134.3 FT |
| 6,550,712 | B1 | | 4/2003 | Peterpaul | | |
| 7,086,622 | B1 | | 8/2006 | Whaley | | |
| 7,293,734 | B1 | * | 11/2007 | Kantner et al. | ........... | 242/395.1 |
| 2004/0041137 | A1 | * | 3/2004 | Shoji | .......................... | 254/342 |

FOREIGN PATENT DOCUMENTS

JP 57039301 A * 3/1982

* cited by examiner

*Primary Examiner*—R. A. Smith
(74) *Attorney, Agent, or Firm*—Ronald E. Greigg

(57) ABSTRACT

The present invention provides an improved quick rewind tape measure having dual modes of manual and power tool assisted operation. A quick rewind tape measure is formed by rotatably placing in an outer case a reel for winding a tape, providing a handle oil the outer side of the case so that the reel can be rotated by the handle to rewind a measuring tape. The handle of the tape measure has dual modes of operation, both manual and power tool assisted. With the power tool assisted mode of operation, the measuring tape can be rewound in a high speed. Consequently, the tape measure has the advantage that an elongate measuring tape having a length of more than 10 m, particularly 50 m to 300 m can be rewound quickly.

13 Claims, 3 Drawing Sheets

TAPE MEASURE WITH MANUAL AND POWER TOOL ASSISTED REWIND HANDLE

This invention relates to tape measures, particularly a quick rewindable tape.

BACKGROUND OF THE INVENTION

A tape measure has hitherto been made by rotatably placing a reel in an outer case and winding a measuring tape around the reel to house the tape in the case when unused. There has been a tape measure in which a coil spring is provided in the interior of the reel and the measuring tape can be automatically rewound around the reel by the restoring force of the spring. This type of tape measure generally been utilized when the tape has a comparatively short length, particularly less than a length of 10 m. Since it is difficult to rewind the tape by the restoring force of a spring when the measuring tape is of a length from 10 m to 100 m, tape measures have been made so that the measuring tape can be rewound by rotating a handle by hand. Tape measures of this kind were prepared by rotatably placing a reel in a case to enable winding the tape around the reel and also by providing a side of the case with a handle for rotating the reel.

SUMMARY OF THE INVENTION

The present invention aims to eliminate the disadvantages known in the field and to provide an improved quick rewind tape measure having dual modes of manual and power tool assisted operation.

According to the present invention there is provided a quick rewind tape measure formed by rotatably placing in an outer case a reel for winding a tape, providing a handle on the outer side of the case so that the reel can be rotated by the handle to rewind a measuring tape. The handle of the tape measure has dual modes of operation, both manual and power tool assisted. With the power tool assisted mode of operation, the measuring tape can be rewound at a high speed. Consequently, the tape measure has the advantage that an elongate measuring tape having a length of more than 10 m, particularly 50 m to 300 m can be rewound quickly.

The invention provides a dual-mode rewindable tape measure apparatus having manual and power tool assisted rewinding modes of operation including a tape measure housing and a spool rotatably supported by the housing about an axis of rotation. An elongated tape measure blade is attached to the spool and wound thereabout. A rewind handle is connected to the spool in a manner such that rotation of the rewind handle causes rotation of the spool about the axis and rewinding of the blade onto the spool in a manual mode of operation. A drive fitting is attached to the rewind handle in a manner such that rotation of a power tool driver engaged with the drive fitting causes rotation of the drive fitting and the attached rewind handle and spool to rewind the blade onto the spool in a power tool assisted mode of operation.

In a preferred embodiment of the invention, the rewind handle is a foldable handle that in an unfolded, open position allows the rewind handle to be rotated to rewind the tape measure blade by the manual mode of operation, and that in a folded, closed position, allows the power tool driver to engage the drive fitting attached to the rewind handle to rewind the tape measure blade by the power assisted mode of operation.

In an alternative embodiment of the invention, the rewind handle is a foldable handle that in an unfolded, open position allows the rewind handle to be rotated to rewind the tape measure blade by the manual mode of operation, and allows the power tool driver to engage the drive fitting attached to the rewind handle to rewind the tape measure blade by the power assisted mode of operation.

The foldable handle includes a first piece attached to the spool, and a second piece hinged to the first piece. The drive fitting is attached to the second piece on an outer surface of the second piece in a manner such that the drive fitting is engagable by the power tool driver when the foldable handle is in the folded, closed position.

The foldable handle comprises a first piece attached to the spool, and a second piece hinged to the first piece. The drive fitting is attached to the first piece in a manner such that the drive fitting is engagable by the power tool driver when the foldable handle is in the unfolded, open position.

The rewind handle has an axis of rotation that is concentric with an axis of rotation of the drive fitting, and both axes are concentric with the axis about which the spool is rotated such that a ratio of rotation of the rewind handle or the drive fitting to rotation of the spool is 1:1.

The drive fitting may also include a rivet nut fastened to the rewind handle and a screw engaging the rivet nut. The screw has a head that engages the power tool driver according to the desires of the user.

The tape measure apparatus is applicable with a housing that is enclosed to protect The tape measure blade. Alternatively, the tape measure housing may he open to allow debris to fall away from the tape measure blade.

Yet further, the winder and the shaft are made of a hard thermoplastic resin, and therefore can be easily manufactured. Even when they are rotated at a high speed, they generate less noise.

The invention brings about various advantages as mentioned above.

BRIEF DESCRIPTION OF THE DRAWINGS

The present invention is explained below referring to the accompanying drawings, in which.

DETAILED DESCRIPTION OF PREFERRED EMBODIMENTS

Figure 1:
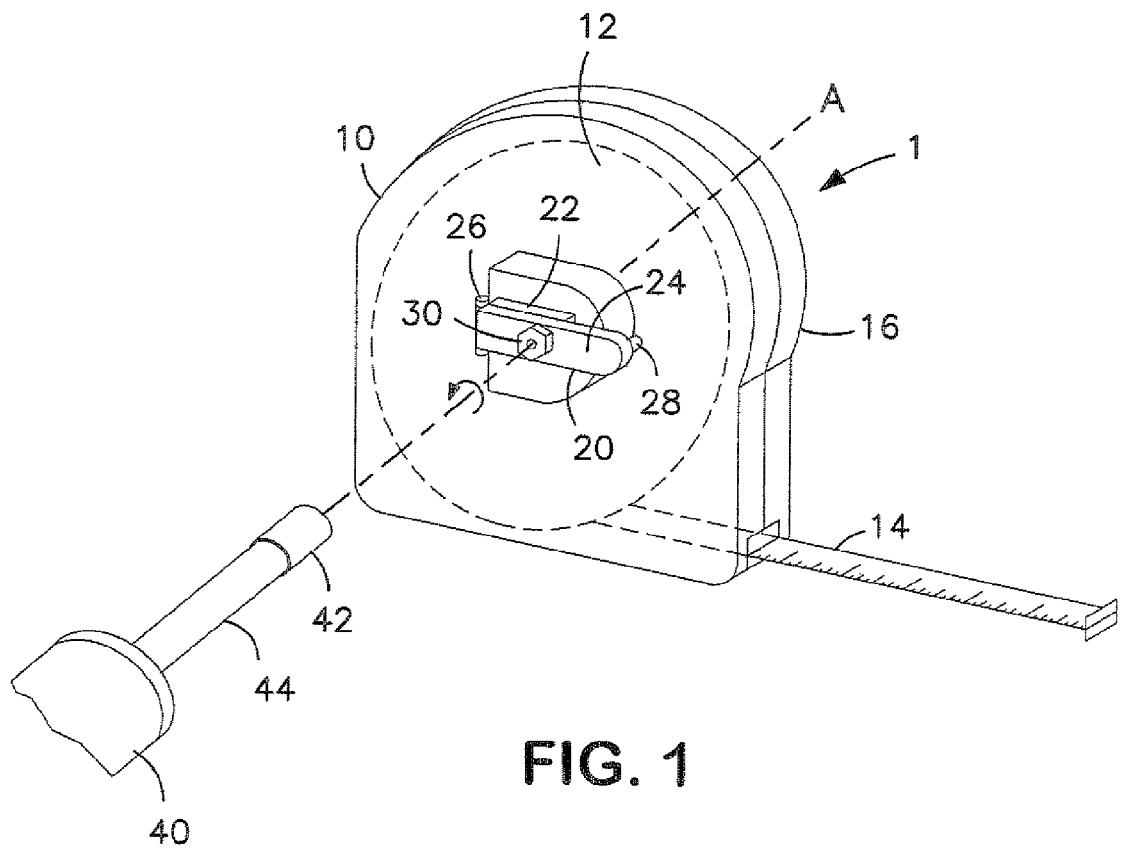
FIG. 1 is a perspective view of a tape measure according to a preferred embodiment of the invention.

Referring to FIG. 1, a preferred embodiment of a tape measure 1 according to the invention is show The tape measure 1 has an outer case 10 which houses a reel or spool 12 (shown in phantom) around which a tape measure blade 14 is wound. The tape measure 12 depicted is a closed reel type of tape measure which encloses and protects the blade 14 when not in use. The outer case 10 is provided with a finger grip 16 which enables a user to grasp the tape measure in a secure manner. One side of the outer case 10 is provided with a handle 20 for manually rewinding the blade 14 onto the reel 12. A preferred embodiment of the handle 20 for rewinding the blade is shown in FIG. 1. The handle 20 is a foldable handle which is in a closed, folded position. The foldable handle 20 has a two piece 22, 24 construction. The two pieces 22, 24 are connected by a hinge 26 which allows the movable piece 24 of the handle to fold open from the closed position to all open extended position in which a user may wind turn the handle by knob 28. A handle shaft (not show in FIG. 1) of the handle 20 is attached to the spool 12 in such a manner that when the handle 20 is rotated, the spool 12 is also rotated and the blade 14 of the tape measure is rewound onto the spool 12. The handle, handle shaft, and spool all rotate about axis A. Thus, the first mode of operating the rewindable tape measure is a manual rewind mode.

The tape measure 1 is further provided with a second mode of operating, to rewind the blade 14 onto the spool with the assistance of a power tool. In FIG. 1, a drive fitting, such as a screw 3O, is shown in the center of the handle 20 along axis A while in the folded, closed position. The screw 30 is attached to the handle 20 in such a manner that if the screw 30 is turned, the handle shaft and attached spool 12 are rotated and the blade 14 of the tape measure 1 is rewound on the spool 12. The screw may have a Phillips head, square head, torx head, nut head, etc., which a power tool easily engages to turn the screw. For example a Phillips head may be desired if the power tool available to the user is a power screw driver. A square headed screw may be more desirable if the user prefers using a power drill. A power tool 40 is exemplified having a nut driver 42 or the like for engaging the drive fitting 30 and a shaft 44 gripped in a chuck of the power tool. Because the screw 30 is attached to the handle shaft and the spool 12 in the manner described above, upon engagement of the driver 42 of the power tool 40 with the screw 30 and rotation of the driver 42, the tape measure blade is automatically rewound by the power tool assistance. Considering the high rpms of a power tool, it will be appreciated how quickly a long blade of the tape measure 1 can be rewound in the power tool assisted second mode of operating compared to the manual handle wind first mode of operation.

The invention offers the user dual mode operation, for instance for a 5 m measure, it is convenient to open the foldable handle and manually rewind the tape measure blade. However, when the reel is directly connected with and rotated by the handle to rewind the measuring tape having the length of 50 m around the reel, one hundred fifty rotations of the handle are required for rewinding the measuring tape and operations for rewinding the measuring tape are troublesome. It would clearly be preferable on such a long measure to have the option provided by the invention to close the foldable handle and engage a power tool with the drive fitting or screw to save time and quickly rewind the blade of the tape measure.

Figure 3:
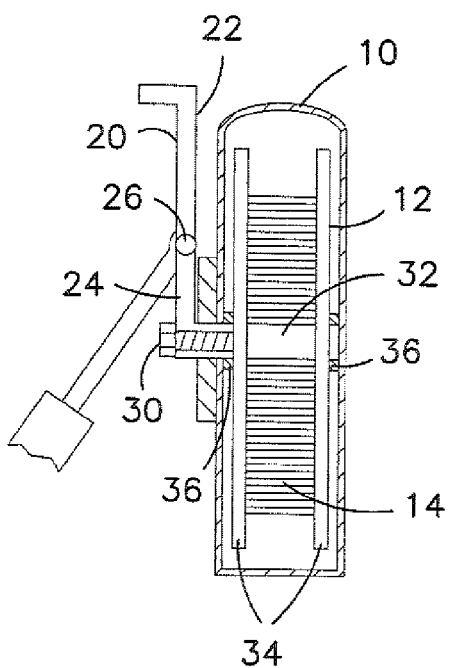
FIG. 3 is a side view of the tape measure of FIG. 2, partly in section.
Figure 2:
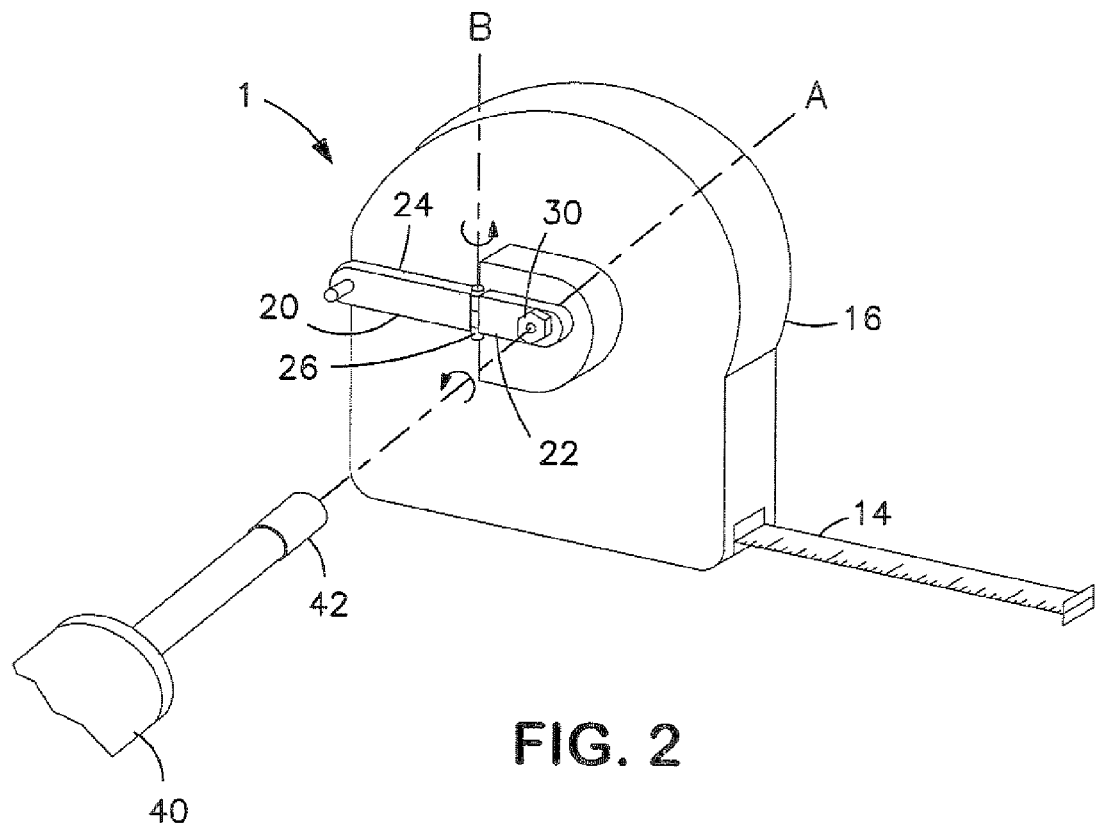
FIG. 2 is a perspective view of a tape measure according to a second embodiment of the invention.

Referring now to FIGS. 2 and 3, a second embodiment of a tape measure according to the invention is shown with like elements numbered the same as in FIG. 1 The tape measure 1 is provided once again with the foldable winding handle 20, which is shown in the unfolded, open position. It can seen with the handle 20 in the open position that the two pieces 22, 24 of the handle are connected by the hinge 26, and the movable piece 24 rotates about axis B to the open position. The drive fitting or screw 30 in this embodiment is attached to the inner piece 22 of the handle 20 along the axis of rotation A of the handle shaft 32, rather than on the outside of the foldable piece 22 of the handle as in the first embodiment. In this case, it will be understood that the handle need not a foldable handle, but also could be constructed as a one piece handle, eliminating the hinge 26. In FIG. 3, it is clear that the handle shaft 32 may be formed integrally with the handle 20, and that the spool 12 is attached in a manner so as to rotate with the handle shaft. The spool 12 is provided with flanges 34 having a large diameter at each of both sides of shaft 32, which is provided with a means (not shown) for fastening the end of the measuring tape blade 14 to the shaft 32. The handle shaft 32 is supported by bearings 36 which may be formed integrally on the inner walls of outer case 10, or in any conventional manner to allow for rotation of the handle shaft 32 and spool 12. The screw 30 is attached to the handle 20 in such a manner that if the screw 30 is turned, the handle shaft and attached spool 12 are rotated and the blade 14 of the tape measure 1 is rewound on the spool 12. Because the screw 30 is attached to the handle shaft and the spool 12 in the manner described above, upon engagement of the driver 42 of the power tool 40 with the screw 30 and rotation of the driver 42, the tape measure blade is automatically rewound by the power tool assistance.

Figure 4:
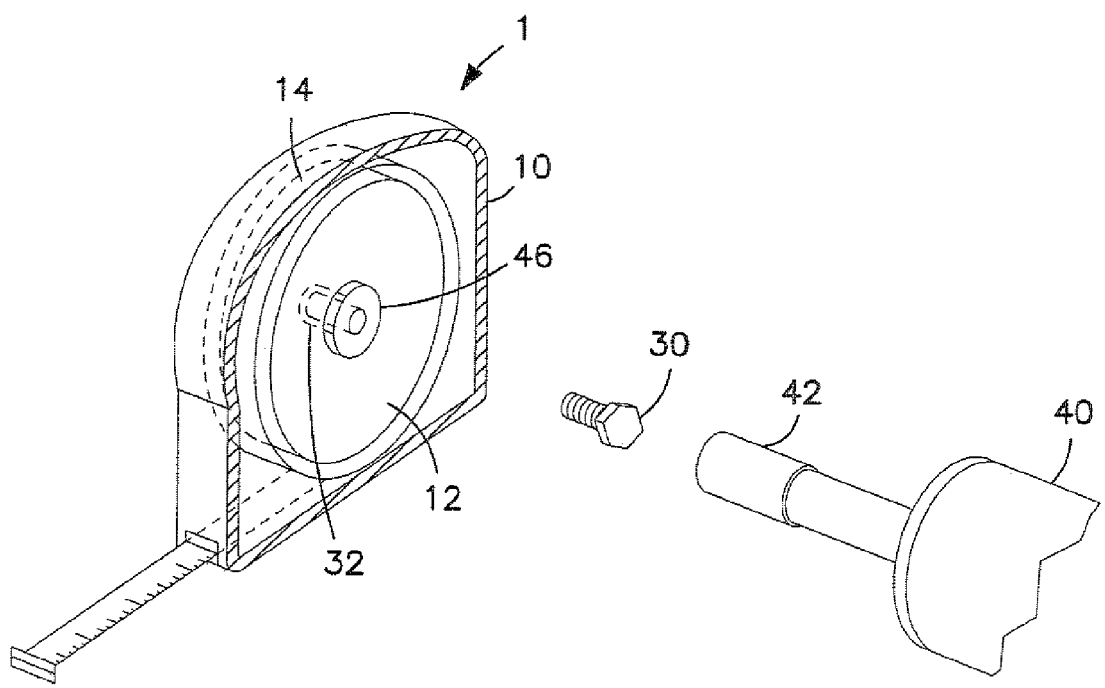
FIG. 4 shows another embodiment of the tape measure according to the invention partly cut away.

Referring now to FIG. 4, a tape measure 1 according to a third embodiment of the invention is shown with a wall of the outer case 10 cut away. A rivet nut 46 is inserted and fastened directly into the shaft 32 of the spool through an aperture (not shown) in the outer wall of the outer case 10. In this particular instance the rewind handle is on the other side (not seen) of the tape measure 1. The rivet nut 40 engages a screw 30 to be screwed into the rivet nut. This enables the user to readily change the desired screw head to engage with an associated driver 42 of the power tool 40. When the power tool 40 is attached via the driver 42 to the screw 30 set in the rivet nut 40, the shaft 32 and spool 12 rotate to rewind the blade 14 onto the spool 12. It will be understood that the rivet nut may by utilized in the previous embodiments as a substitute for the drive fitting being directly attached to the handle pieces. This provides the user with more options to select a desired drive fitting to be attached into the rivet nut.

Figure 5:
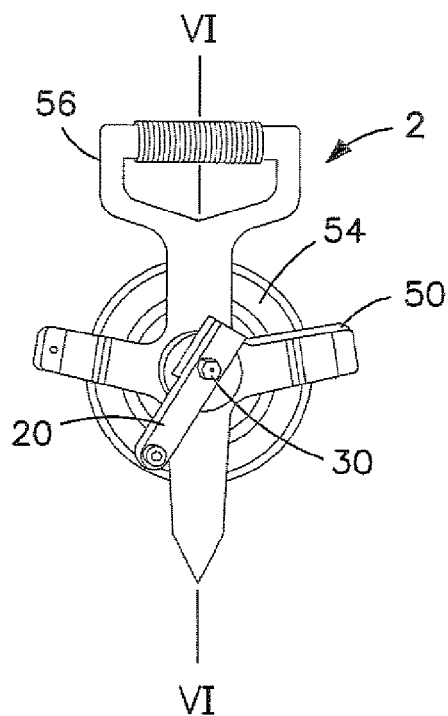
FIG. 5 is a front view of another type of tape measure according to the invention.
Figure 6:
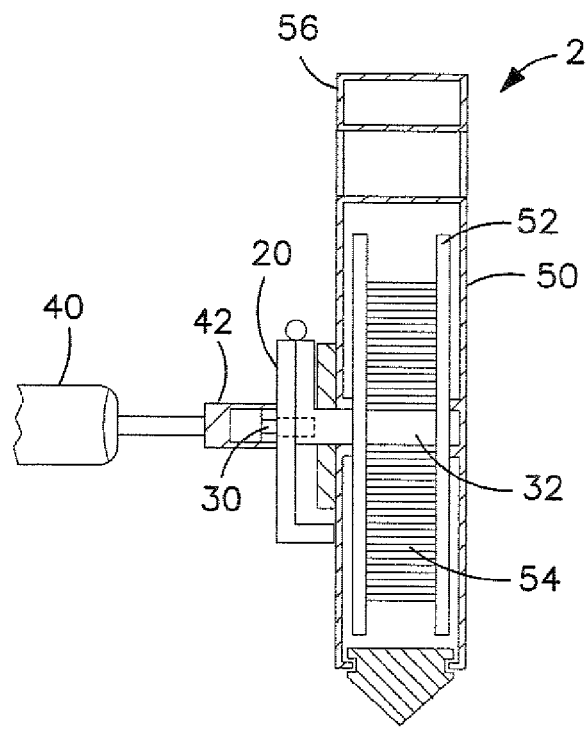
FIG. 6 is a partial sectional view of the tape measure of FIG. 5 taken along line VI-VI.

Referring now to FIGS. 5 and 6, a tape measure 2 is shown having dual mode rewind operation according to the invention. The tape measure 2 has a case 50 which houses a reel or spool 52 around which a tape measure blade 54 is wound. The tape measure 12 depicted is an open reel type of tape measure having an open reel design which allows dirt, sand and other debris to fall away from the case 50 and blade 54. The case 50 is provided with a handle 56 which enables a user to grasp the tape measure 2 in a secure manner. One side of the case 50 is provided with a rewind handle 20 for manually rewinding the blade 54 onto the reel 52. The handle depicted in FIG. 6 is identical to handle of the first embodiment shown in FIG. 1, and is described above. The power tool 40 is shown attached to the tape measure 2 by the driver 42 being engaged with the drive fitting 30 on the outside of the folded handle 20. It will be understood that rotation of the driver 42 by the power tool 40 rotates the drive fitting connected to the handle 20 and thereby rotates the spool shaft 32 and spool 52.

Suggested materials and construction for the tape measure according to the invention follow. The tape measure outer case may be constructed from ABS plastic or PVC coated metal. The measuring tape blade 14 is made of a band steel, a fiber-reinforced synthetic resin band or the like, and has usually a length of 50 m to 100 m. The blade can be provided with a folding end hook or ring. Graduations or marking are provided on the blades. Handle 20, handle shaft 32 and spool 12 are preferably made of hard thermoplastic synthetic resin, for example such as polyacetal. Gearing may be provided between the handle shaft and spool to increase the ratio spool rotations to handle shaft rotations such as 3:1 rather than the 1:1 ratio shown herein.

It is readily apparent that the above-described tape measure meets all of the objects mentioned above and also has the advantage of wide commercial utility. It should be understood that the specific form of invention described herein is intended to be representative only, as certain modifications within the scope of these teachings will be apparent to those skilled in the art.

I claim:

1. A dual-mode rewindable tape measure apparatus having manual and power tool assisted rewinding modes of operation, comprising:
   a tape measure housing;
   a spool rotatably supported by said housing about an axis;
   an elongated tape measure blade attached to said spool and wound thereabout;
   a rewind handle connected to said spool in a manner such that rotation of said rewind handle causes rotation of said spool about said axis and rewinding of said blade onto said spool in a manual mode of operation; and
   a drive fitting attached to said rewind handle in a manner such that rotation of a power tool driver engaged with said drive fitting causes rotation of said drive fitting and the attached rewind handle and spool to rewind said blade onto said spool in a power tool assisted mode of operation, wherein said rewind handle comprises a foldable handle that in an unfolded, open position allows said rewind handle to be rotated to rewind said tape measure blade by said manual mode of operation, and that in a folded, closed position, allows said power tool driver to engage said drive fitting attached to an outside of said folded rewind handle to rewind said tape measure blade by said power assisted mode of operation while said handle is folded.

2. The tape measure apparatus of claim 1, wherein said foldable handle comprises a first piece attached to said spool, and a second piece hinged to said first piece, wherein said drive fitting is attached to said second piece on an outer surface of said second piece in a manner such that said drive fitting is engagable by said power tool driver when said foldable handle is in the folded, closed position.

3. The tape measure apparatus according to claim 1, wherein said rewind handle has an axis of rotation that is concentric with an axis of rotation of said drive fitting, and both axes are concentric with said axis about which said spool is rotated such that a ratio of rotation of said rewind handle or said drive fitting to rotation of said spool is 1:1.

4. The tape measure apparatus according to claim 1, wherein said rewind handle has an axis of rotation that is concentric with an axis of rotation of said drive fitting, and both axes are offset from said axis about which said spool is rotated in a manner such that a ratio of rotation of said rewind handle or said drive fitting to rotation of said spool is greater than 1:1.

5. The tape measure apparatus according to claim 1, wherein said drive fitting comprises a rivet nut fastened to said rewind handle and a screw engaging said rivet nut, and wherein said screw has a head that engages said power tool driver.

6. The tape measure apparatus according to claim 1, wherein the tape measure housing is enclosed to protect the tape measure blade.

7. The tape measure apparatus according to claim 1, wherein the tape measure housing is open to allow debris to fall away from the tape measure blade.

8. A dual-mode rewindable tape measure apparatus having manual and power tool assisted rewinding modes of operation, comprising:
   a tape measure housing;
   a spool rotatably supported by said housing about an axis;
   an elongated tape measure blade attached to said spool and wound thereabout;
   a rewind handle connected to said spool in a manner such that rotation of said rewind handle causes rotation of said spool about said axis and rewinding of said blade onto said spool in a manual mode of operation; and
   a drive fitting attached to said rewind handle in a manner such that rotation of a power tool driver engaged with said drive fitting causes rotation of said drive fitting and the attached rewind handle and spool to rewind said blade onto said spool in a power tool assisted mode of operation, wherein said rewind handle comprises a foldable handle that in an unfolded, open position allows said rewind handle to be rotated to rewind said tape measure blade by said manual mode of operation, and allows said power tool driver to engage said drive fitting attached to said rewind handle to rewind said tape measure blade by said power assisted mode of operation, and that in a folded, closed position covers said drive fitting;
   wherein said drive fitting comprises a rivet nut fastened to said rewind handle and a screw engaging said rivet nut, and wherein said screw has a head that engages said power tool driver.

9. The tape measure apparatus of claim 8, wherein said foldable handle comprises a first piece attached to said spool, and a second piece hinged to said first piece, wherein said drive fitting is attached to said first piece in a manner such that said drive fitting is engagable by said power tool driver when said foldable handle is in the unfolded, open position.

10. The tape measure apparatus according to claim 8, wherein the tape measure housing is enclosed to protect the tape measure blade.

11. The tape measure apparatus according to claim 8, wherein the tape measure housing is open to allow debris to fall away from the tape measure blade.

12. The tape measure apparatus according to claim 8, wherein said rewind handle has an axis of rotation that is concentric with an axis of rotation of said drive fitting, and both axes are concentric with said axis about which said spool is rotated such that a ratio of rotation of said rewind handle or said drive lifting to rotation of said spool is 1:1.

13. The tape measure apparatus according to claim 8, wherein said rewind handle has an axis of rotation that is concentric with an axis of rotation of said drive fitting, and both axes are offset from said axis about which said spool is rotated in a manner such that a ratio of rotation of said rewind handle or said drive fitting to rotation of said spool is greater than. 1:1.

* * * * *